United States Patent [19]

Clark et al.

[11] Patent Number: 5,095,303

[45] Date of Patent: Mar. 10, 1992

[54] SIX DEGREE OF FREEDOM GRAPHIC OBJECT CONTROLLER

[75] Inventors: Michael R. Clark, Glendale; Musa Mustafa, Laverne, both of Calif.

[73] Assignee: Apple Computer, Inc., Cupertino, Calif.

[21] Appl. No.: 499,931

[22] Filed: Mar. 27, 1990

[51] Int. Cl.$^5$ .............................................. G09G 5/00
[52] U.S. Cl. .................................... 340/710; 340/709
[58] Field of Search ............... 340/710, 709, 706, 711; 74/471, 471 R; 273/148 B; 364/578

[56] References Cited

U.S. PATENT DOCUMENTS

| | | | |
|---|---|---|---|
| 4,562,347 | 12/1985 | Hovey et al. | 340/710 |
| 4,692,756 | 9/1987 | Clark | 340/709 |
| 4,933,670 | 6/1990 | Wislocki | 340/709 |

OTHER PUBLICATIONS

Leon, "Thumbwheel Positional Control Unit", IBM Technical Disclosure Bulletin, vol. 21, No. 7, Dec. 1978, pp. 3026-3027.

*Primary Examiner*—Jeffery A. Brier
*Attorney, Agent, or Firm*—Tim Casey

[57] ABSTRACT

A six degrees of freedom interactive display controller device is disclosed, comprising a hand manipulable housing unit having an opening for the passage of a mouse ball, two motion detectors for detecting the movement of the mouse ball and converting that motion to output signals controlling the tranlational movement of an object on the display of a computer, a finger operated conveyor belt or roller for controlling the translational motion of the object with respect to a third translational axis, a first finger controlled mechanism, such as a wheel and motion encoders, affixed to the housing for controlling the rotational motion (pitch) of the object with respect to a first one of the translational axes, a second finger controlled mechanism affixed to the housing for controlling the rotational motion (roll) of the object with respect to a second one of the translational axes, and a third finger controlled mechanism affixed to the housing unit for controlling the rotational motion (yaw) of the object with respect to a third one of the translational axes. All translation and rotation controls are operable to be physcially moved in a direction which corresponds to the desired simulated direction of movement of the object on the display. The physical motion of each control is unbounded and the actual physical position of the housing unit is independent of the simulated position of the object on the display.

32 Claims, 3 Drawing Sheets

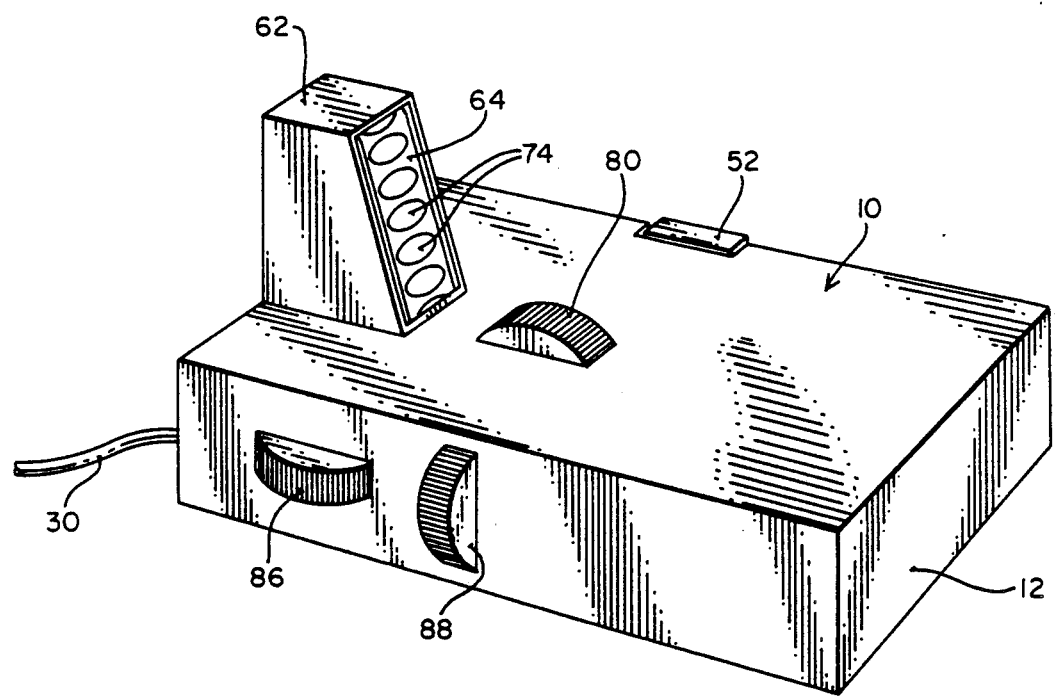
FIG_1

FIG_2
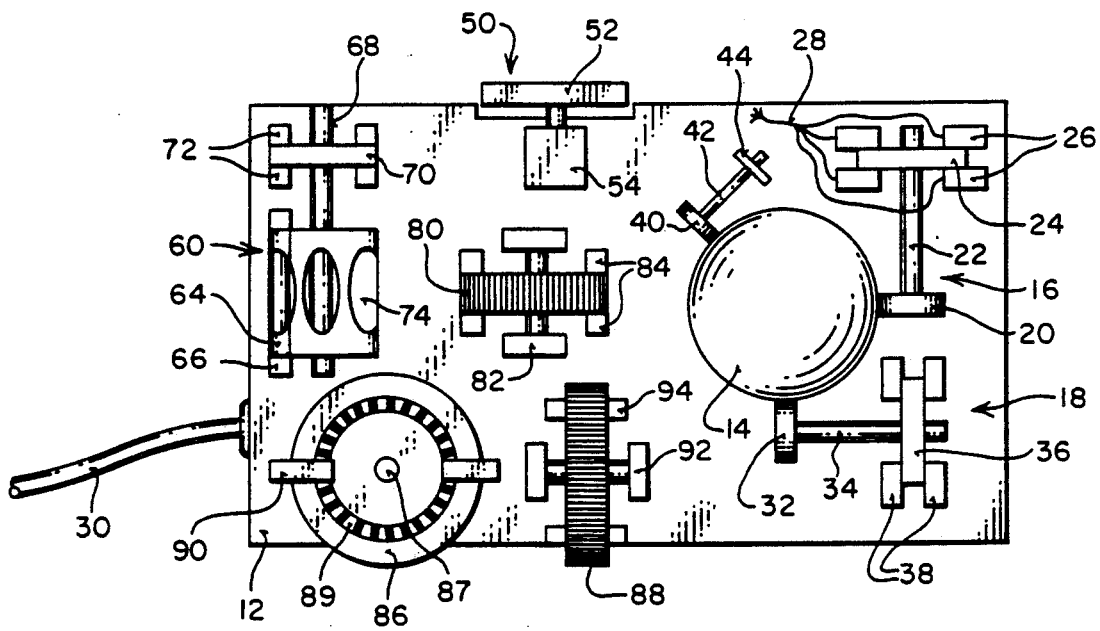
FIG_3
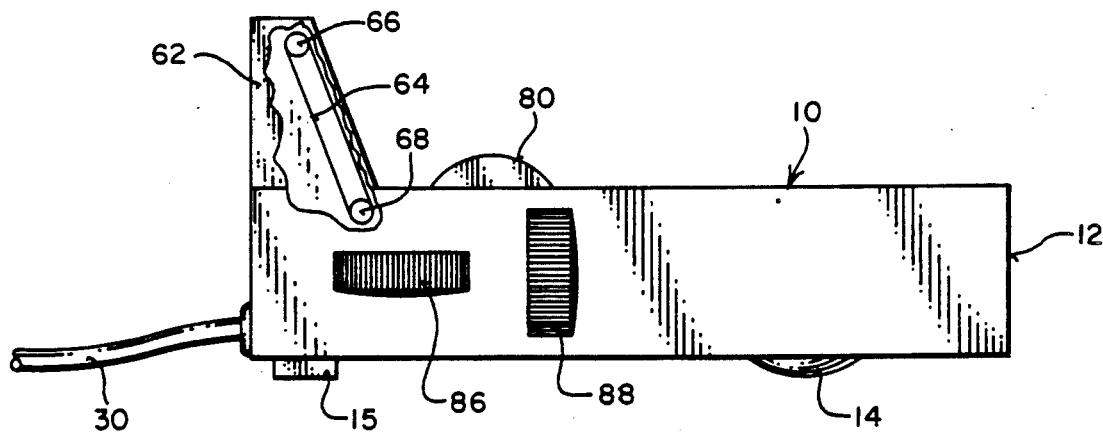

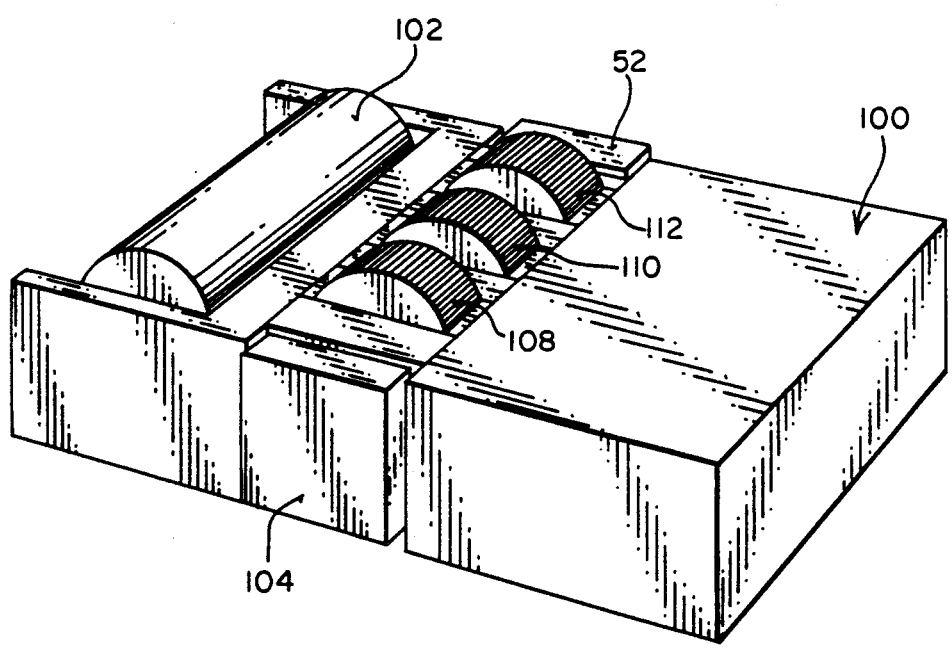
FIG_4

SIX DEGREE OF FREEDOM GRAPHIC OBJECT CONTROLLER

FIELD OF THE INVENTION

The present invention relates generally to control devices for manipulating the position of objects on the display of a computer system, and more particularly to an improved control device for manipulating such objects in at least three degrees of freedom.

BRIEF DESCRIPTION OF PRIOR ART

Many computers, when equipped with sufficient memory and appropriate software, are capable of generating images of three dimensional objects. Displaying such objects, however, is only of relative usefulness if the position and orientation of the displayed objects cannot be readily controlled by the user. Although a prior art two-dimensional control device, such as a mouse, trackball or stylus, allows a user to control simple two dimensional movements of a three dimensional object, such a device generally does not allow the user to control movement of the object in a third degree of freedom, so as to simulate translational three dimensional movement, or in other degrees of freedom, to simulate complex three dimensional manipulations, such as yaw, pitch and roll.

To allow standard control devices to be used to control the movement of a three dimensional object relative to a third degree of freedom, standard control devices have been used in conjunction with keyboard commands or other physically input commands requiring the use of a second hand to control object translation along a third axis. For example, two dimensional mouse controllers, which control motion relative to a Y and Z axis, are often used in combination with the up and down arrow control keys on a keyboard to control translational movement of the object relative to the X-axis. This technique for manipulating a three dimensional object is generally unsatisfactory for the replication of natural-like control of the object because it requires the user to devote two hands to carrying out the manipulations (one to move the mouse and one to push the keyboard buttons). Hence, the object's motion along the third axis is generally difficult to control and coordinate, and no provision is made for allowing the user to separately control the yaw, pitch or roll of the object.

Trackballs and mice have also been modified to allow the user to simultaneously control movement of an object with respect to three translational axes. Evans, Tanner and Wein, "Tablet-Based Valuators that Provide One, Two, or Three Degrees of Freedom", *Computer Graphics*, Volume 15, Number 3, August 1981, page 91, describes a tablet-based three-axis trackball which emulates a standard two-axis trackball and includes a third sensor so that rotation can be simultaneously detected about each of three orthogonal axes. The trackball detects motion about the X-axis by rolling the ball up and down, the Y-axis by rolling the ball sideways, and the Z-axis by twisting the ball clockwise or counter-clockwise. Such devices do not provide the additional control which is required to rotate the object about any of its three translational axes. In addition, because all axes are simultaneously controlled by a single physical element (the ball), independent control of the object with respect to a single axis, without effecting the other axes, is difficult.

Control devices, however, have been created which provide some degree of independent control over the movement of three dimensional objects in relation to three axes and/or control over the rotation of such objects (yaw, pitch and roll) relative to those axes. One such device is a virtual controller, which uses a standard control device in conjunction with special software to remap the standard two dimensional motion of the control device to a different type of motion. For example, a virtual controller could be designed to take signals generated by the control device when making an in and out motion and to remap those signals to cause the object to change its yaw rotation. One problem with this type of device is that the user must set and/or change the desired mapping before taking and/or changing actions to create the desired effect. Another problem with this type of device is that the effect of a desired user action may often be difficult for the user to conceptualize, thereby making use of the device both awkward and unfriendly.

A second type of prior art controller, having a joystick or stick-shift type handgrip, is shown in Monge, U.S. Pat. No. 3,350,956, and King, U.S. Pat. No. 4,555,960. These references disclose a type of controller having four basic limitations which make its use as an input controller and object manipulator difficult. First, the device is bounded, meaning that the physical construction of the device limits the distance the handgrip can be moved in any one direction, thereby limiting the distance the object can likewise be moved. This limitation is undesirable because, in some computing simulations, it may be preferable to move the object in one particular direction for a longer period of time, or over a greater distance, than allowed by the boundaries of the device. Second, because all axes of motion are controlled by a single handgrip, it is difficult to move the object with respect to any one particular axis without also causing changes with respect to the other axes. Third, because the device is physically bounded, the position output signal of the device, which controls the position and orientation of the object, must be absolutely related to the physical position of the handgrip, which again limits the unbounded motion of the object. Fourth, because the handgrip of the device is controlled by movement of the user's entire arm or arms, precise control of the device, and therefore the object, may be difficult and in some situations fatiguing.

A third type of device involves the use of a sphere shaped control mounted on the end of a stick or suspended in the center of a weighted base. This type of device controls the position and orientation of the object on the screen by detecting very small changes in the orientation of the ball along with the degree of force exerted on the ball by the user. Since a continual force in one direction can be translated as a continual movement, this type of device resolves the bounding problem of the joystick device, but does nothing to eliminate interdependence of the position output signal on the physical movement of the controller, nor does it remove the likelihood of user arm fatigue.

A fourth type of device involves the use of a box with six or more rotating knobs corresponding to each type of movement to be controlled. Although this device resolves problems with bounding and interdependence, the direction of physical motion for all axes is rotary and therefore does not match the simulated motion of the object. In addition, the user must use two hands to simultaneously control more than one axis.

A fifth type of device, such as the 3SPACE Isotrak controller by the Polhemus Navigation Sciences Division of McDonnel Douglas Electronics Company, Colchester, Vermont, uses a stationary source for generating a low-frequency magnetic field to a sensor which monitors changes in the magnetic field caused by the sensor's own movement. The sensor is small and lightweight and can be mounted on or within a wide variety of nonmetallic devices, such as a stylus or sphere, which can then be manipulated by the user in free-space to control the movement of an object on an associated computer's display. Because this type of device requires the user to hold the sensor in the air within the magnetic field while in use, it is heavily dependent on the agility and stamina of the user's arm to maintain control over the object's position and orientation. In addition, this type of device is bounded because it will only operate within the magnetic field of the source. The position output signal of such a device is, like a number of the other prior art devices, interdependent on the actual physical position of the sensor. Finally, because the device emits radio waves, it cannot be operated around large metallic objects, such as desks or filing cabinets, or other electronic devices which could be adversely affected by the transmitted magnetic field.

SUMMARY OF THE INVENTION

A preferred embodiment of the controller device of the present invention is comprised of a hand manipulable housing unit having an opening for the passage of a mouse ball, two motion detectors for detecting the movement of the mouse ball and converting that motion to output signals controlling the translational movement of an object on the display of a computer, a finger operated conveyor belt or roller for controlling the translational motion of the object with respect to a third translational axis, a first finger controlled mechanism including a wheel and motion encoders affixed to the housing for controlling the rotational motion (pitch) of the object with respect to a first one of the translational axes, a second finger controlled mechanism affixed to the housing for controlling the rotational motion (roll) of the object with respect to a second one of the translational axes, and a third finger controlled mechanism affixed to the housing unit for controlling the rotational motion (yaw) of the object with respect to a third one of the translational axes. All translation and rotation controls are operable to be physically moved in a direction which corresponds to the desired simulated direction of movement of the object on the display. The physical motion of each control is unbounded and the actual physical position of the housing unit is independent of the simulated position of the object on the display.

BRIEF DESCRIPTION OF THE DRAWING

FIG. 1 is a perspective view of a preferred embodiment of the controller device of the present invention;

FIG. 2 is a partially-broken top plan view of the controller device of FIG. 1;

FIG. 3 is partially-broken side elevational view of the controller device of FIGS. 1 and 2; and FIG. 4 is a perspective view of an alternative embodiment of the controller device of the present invention.

DETAILED DESCRIPTION OF PREFERRED EMBODIMENT

Referring now to FIGS. 1, 2 and 3, there is illustrated a hand controller, shown generally as 10, in accordance with the preferred embodiment of the present invention. The controller 10, having a main housing 12, operates to control the position and orientation of a computer generated image or object (not shown) on the display of the computer. The image is manipulated (moved or modified) by the controller 10 with respect to two orthogonal translational axes in a manner which is similar to the operation of a standard object control device, such as a mouse, the operation of which is well known in the art. The position of the object with respect to those two axes is controlled by the movement of a mouse ball 14, which is suspended within the housing 12 in a manner which is well known in the art, so that the user can freely roll the ball 14 over flat horizontal surfaces. The height of a Teflon ®-like slider 15 (illustrated in FIG. 3) attached to the bottom of the housing approximately corresponds to the drop of the mouse ball 14, so that the controller 10 remains in a level position over the horizontal surface upon which it is moved.

Within the housing 12 are two encoders, a Z-axis encoder shown generally as 16 for detecting "in" and "out" user directed motions of the controller 10, and a X-axis encoder shown generally as 18 for detecting "right" and "left" user directed motions of the controller 10. The Z-axis encoder 16 is comprised of a ball contact wheel 20 and wheel shaft 22 for driving an encoder 24 in response to movements of the ball 14. Detectors 26, generally comprised of an LED and a phototransistor located on opposite sides of the encoder 24, sense the movement of the ball 14 through rotation of the encoder 24 and output a quadrature signal to the computer, not shown, through the wiring harness 30, over four electrical wires 28. This quadrature signal corresponds to changes in the translational position of the housing 12 and ball 14 and is used by the computer to control the simulated position of the object with respect to a Z-axis of the display. Detectors 26 could also be electromagnetic devices or any of a number of other types of motion detectors.

So as to not unnecessarily obscure the present invention, some inconsequential electrical components and wiring, such as wires 28, are only partially illustrated. Also to be noted, when constructing a controller 10 in accordance with the present invention, it will generally be necessary to reduce the number of wires traveling from the controller 10 to the computer through the wiring harness 30 by time-multiplexing the quadrature signals from each set of detectors and the data signals from the other electrical components within the controller for transmission to the computer over a single data line. Hence, the only wires passing through the wiring harness 30 would be the power and ground lines for the various electrical components within the controller 10, a grounded shielding cable for reducing EMI transmissions, and a single data line. It would also be possible to eliminate the wiring harness 30 completely by providing the controller with its own resident power source and transmitting data signals from the controller 10 to the computer using wireless transmission technology, such as through means of infrared transmission.

Referring now back to FIG. 2, the X-axis encoder 18 is comprised of a ball contact wheel 32 and wheel shaft 34 for driving an encoder 36. Detectors 38 sense the movements of the ball 14 through rotation of the encoder 36 and output a quadrature signal to the computer. This quadrature signal corresponds to changes in the translational position of the housing 12 and ball 14 and is used by the computer to control the simulated position of the object with respect to a X-axis of the display. A third contact wheel 40 connected to a support shaft 42 and a support member 44 applies pressure against ball 14 to keep it in contact with wheels 20 and 32.

Another standardized feature of the controller of the present invention is the selection mechanism 50, which is comprised of a selection button 52 and a selection switch 54. The selection mechanism 50 allows the user to perform particular actions through use of the controller, such as selecting and dragging objects across the display screen of the computer, in a manner which is well understood by persons of ordinary skill in the art.

A conveyor mechanism 60 is utilized to control the "up" and "down" translations of the object with respect to a third translational axis, the Y-axis. Conveyor 60, which is housed within a tower 62 abutting the top of housing 12, is comprised of a conveyor belt 64 wrapped around a top shaft 66 and a bottom shaft 68. Conveyor belt 64 has a number of finger holes 74 formed within its broad side surfaces through which the user can insert a finger and thereby move the belt either "up" or "down". The surface of the belt 64 could also be knurled, or otherwise roughened, so that the user's finger can readily engage the belt 64 without his finger slipping across its surface. Moving the conveyor belt 64 rotates both shafts 66 and 68, thereby driving the conveyor encoder 70. The rotational motion of the conveyor encoder 70 is measured and converted to a quadrature signal by the detectors 72, in a manner similar to that of the detectors of translation encoders 16 and 18. This quadrature signal corresponds to changes in the translational position of the belt 64 and is used by the computer to control the simulated position of the object with respect to a Y-axis of the display.

A controller having three translational axis encoders similar to those described above would be effective for controlling a computer generated object with respect to at least three degrees of freedom. As stated above, two of the translational axes would be controlled in the familiar manner of a standard mouse controller. Whereas, the third degree of freedom would be controlled by the delicate motions of the user's finger on the conveyor belt 64, thereby allowing the user to simultaneously or independently control each of the axes of translation with a single hand.

It should be noted that the physical construction of the controller 10 makes it possible to directly map the physical motion of the controller with respect to each of the translational axes (up/down, left/right, and in/out) to the simulated motion of the object. For example, if a user desires to move the object to the left, he simply moves the controller 10 to the left, and if the user desires to move the object up, he simply moves his finger touching the belt 64 up. Hence, the user can easily conceptualize the simulated effect that each type of physical motion by the user with respect to the controller 10 or one of its associated control mechanisms will have on the position of the object on the display. In addition, the physical construction of the controller 10 resolves problems regarding physical bounding and interdependence between the actual position of the controller 10 and the simulated position of the object on the display.

In addition to the three dimensional control of the position of the object made possible by the present invention, additional degrees of freedom can likewise be controlled, thereby enhancing the user's ability to control both the object's position and orientation on the display. As illustrated in FIGS. 1, 2 and 3, a pitch thumbwheel 80, mounted on supports 82, is positioned within the controller 10 near the tower 62 so as to extend above the top surface of the housing 12 where the thumbwheel 80 can be readily manipulated by one of the user's fingers. As with the translation encoders, the motion of the thumbwheel 80 is detected by detectors 84 and converted to a quadrature signal for output to the computer. By moving the thumbwheel 80, the user can independently manipulate the pitch of the object by causing it to rotate with respect to the X-axis. To enable the user to easily engage the thumbwheel 80, the contact surface of the wheel should be rough, i.e., grooved or knurled.

The user can likewise manipulate the yaw or roll of the object by moving a yaw thumbwheel 86 or a roll thumbwheel 88, thereby causing the object to rotate with respect to the Y-axis or Z-axis respectively. Moving the yaw thumbwheel 86 around its support 87 causes rotation of the encoder ring 89 in a manner similar to the other encoders of the controller 10. Detectors 90 sense the motion of the encoder ring 89 and convert it to a quadrature signal for transmission to the computer. The motion of roll thumbwheel 88 around its supports 92 is likewise sensed by detectors 94 and converted to a quadrature signal for output to the computer.

It is preferable to physically position each one of the thumbwheels in a manner which enhances the association between the physical motion of the control mechanism and the effect of such action on the simulated motion of the object. For example, yaw thumbwheel 86 rotates in a direction which corresponds to the simulated rotation of the object about the Y-axis, thereby accurately reflecting the type of motion that will be simulated (yaw) in the object when the thumbwheel is manipulated.

Although the user's conceptualization of the effect of certain physical movements may be enhanced by the previously described physical construction of the controller 10 and its control mechanisms, such as conveyor 60 and thumbwheels 80, 86 and 88, that physical construction is only preferable and is not a specific requirement of the present invention. Other constructions, such as that of the alternative embodiment depicted in FIG. 4, could likewise be utilized in accordance with the present invention, thereby providing three degrees of rotational freedom in addition to the three degrees of translational freedom already provided.

The alternative embodiment of the controller 100 depicted in FIG. 4, although physically configured differently, is basically equipped in the same manner as controller 10, i.e., with a mouse ball 14, three translational encoders, including encoders 16 and 18 (not shown), and three rotational encoders. Controller 100, as well as controller 10, could also be equipped with optical detectors, instead of a ball 14 and encoders 16 and 18, to detect the translational position of the controller with respect to the X and Z-axes (a number of such techniques are well known in the art). Another alternative physical embodiment is to replace the conveyor belt 64 and tower 62 with a roller 102, as shown in FIG. 4, for performing the same type of controlling manipulations of the object. Controller 100 is also equipped with an extra selection button 104, in addition to selection button 52, to accommodate two different selection actions or to provide left or right-handed users with a convenient selection switch. It should be noted that although the selection switches in both embodiments are depicted as being mounted on the sides of the controller, these switches could be mounted at any position on the controller housing, such as on the top of the controller housing 12 near the pitch thumbwheel 80.

Yaw thumbwheel 108, pitch thumbwheel 110 and roll thumbwheel 112 of controller 100 similarly correspond to the thumbwheels described above with respect to controller 10. Unlike the thumbwheels 86 and 88 of controller 10, however, the physical construction of the thumbwheels 108 and 112 do not necessarily enhance the user's association between the physical movement of the thumbwheel and the simulated effect on the object. Nonetheless, like the other thumbwheels, each thumbwheel still allows the user to control rotation of the object with respect to each of the translation axes, and the motion simulated by each thumbwheel is still independent of the motion of the other axes.

In addition, all of the above controllers, or other types of controllers constructed in a manner consistent with the above descriptions, are still unbounded devices because each of the degrees of freedom may be ratcheted by the user. For example, to repeatedly move the object "down" with respect to the Y-axis, the user simply strokes down on the belt 64 a number of times, thereby causing an encoder to rotate in the appropriate direction and generate an output signal to the computer corresponding to the movements of the belt 64. Roller 102, ball 14, and any of the thumbwheels could likewise be ratcheted.

Although the present invention has been described with reference to FIGS. 1-3 with emphasis on a preferred embodiment and FIG. 4 with respect to an alternative embodiment, it should be understood that the figures are for illustration only and should not be taken as limitations upon the invention. It is contemplated that many changes and modifications may be made to the present invention by one of ordinary skill in the art, after having read the above description, without departing from the spirit and scope of the invention as disclosed above.

I claim:

1. A device for providing signals indicative of an object's location on a display, comprising:
   a housing operative to be manipulated by a user;
   a first translation position indicating means affixed to said housing for producing a first signal indicative of a first position of said object on said display with respect to a first translational axis;
   a second translation position indicating means affixed to said housing for producing a second signal indicative of a second position of said object on said display with respect to a second translation axis;
   a third translation position indicating means affixed to said housing, including a bidirectional controller operated by one or more fingers of said user, for producing a third signal indicative of a third position of said object on said display with respect to a third translation axis, said bidirectional controller having a belt operative to be bidirectionally moved by said fingers of said user and means for detecting the bidirectional movement of said belt and converting the detected movement of said belt to said third signal, said belt having two broad side surfaces having a plurality of fingertip sized holes formed therein through which said fingers can be inserted; and
   a first orientation indicating means affixed to said housing for converting the motion of a first bidirectional manipulator operated by said fingers of said user into a first orientation signal indicative of the orientation of said object on said display with respect to one of said first, second or third translational axis;
   whereby a movement of said device over a surface results in said first and second positions of said object being defined on said display, whereby a movement of said bidirectional controller results in said third position of said object being defined on said display, and whereby a movement of said first bidirectional manipulator results in a change in the orientation of said object.

2. The device as recited in claim 1, wherein said third translational axis corresponds to a vertical axis on said display, and wherein said housing further includes a belt tower rising from said housing for enclosing said belt, said tower having an aperture through which said fingers can be inserted to engage said belt, said belt being physically aligned within said tower to substantially correspond to the displayed alignment of said vertical axis, whereby vertical movements of said belt directly correspond to changes in the position of said object on said display with respect to said vertical axis.

3. The device as recited in claim 1, wherein said first bidirectional manipulator includes:
   a wheel having means operative to be bidirectionally moved by said fingers of said user; and
   means for detecting the bidirectional movement of said wheel and converting the detected movement of said wheel to said first orientation signal.

4. The device as recited in claim 3, wherein said wheel is physically aligned in relation to said housing so as to rotate in a manner corresponding to the direction of rotation about said first translational axis, whereby the rotational movement of said wheel visually corresponds to changes in the orientation of said object on said display with respect to said first translational axis.

5. The device as recited in claim 1, and further comprising a second orientation indicating means affixed to said housing for converting the motion of second birdirectional manipulator operated by said fingers into a second orientation signal indicative of the orientation of said object on said display system with respect to one of said first, second or third translational axis.

6. The device as recited in claim 5, wherein said first bidirectional manipulator includes:
   a first wheel having means operative to be bidirectionally moved by said fingers of said user; and
   means for detecting the bidirectional movement of said first wheel and converting the detected movement of said first wheel to said first orientation signal.

7. The device as recited in claim 6, wherein said second bidirectional manipulator includes:
   a second wheel having means operative to be bidirectionally moved by said fingers of said user; and
   means for detecting the bidirectional movement of said second wheel and converting the detected movement of said second wheel to said second orientation signal.

8. The device as recited in claim 7, wherein said first wheel is physically aligned in relation to said housing so as to rotate in a manner corresponding to the direction of rotation about said first translational axis, and wherein said second wheel is physically aligned in relation to said housing so as to rotate in a manner corresponding to the direction of rotation about said second translation axis, whereby rotational movements of said first wheel visually correspond to changes in the orientation of said object on said display with respect to said first translational axis and rotational movements of said second wheel visually correspond to changes in the orientation of said object on said display with respect to said second translational axis.

9. The device as recited in claim 5, and further comprising a third orientation indicating means affixed to said housing for converting the motion of a third bidirectional manipulator operated by said fingers into a third orientation signal indicative of the orientation of said object on said display system with respect to one of said first, second or third translational axis.

10. The device as recited in claim 9, wherein said first bidirectional manipulator includes:
   a first wheel having means operative to be bidirectionally moved by said fingers of said user; and
   means for detecting the bidirectional movement of said first wheel and converting the detected movement of said first wheel to said first orientation signal.

11. The device as recited in claim 10, wherein said second bidirectional manipulator includes:
   a second wheel having means operative to be bidirectionally moved by said fingers of said user; and
   means for detecting the bidirectional movement of said second wheel and converting the detected movement of said second wheel to said second orientation signal.

12. The device as recited in claim 11, wherein said third bidirectional manipulator includes:
   a third wheel having means operative to be bidirectionally moved by said fingers of said user; and
   means for detecting the bidirectional movement of said third wheel and converting the detected movement of said third wheel to said third orientation signal.

13. The device as recited in claim 12, wherein said first wheel is physically aligned in relation to said housing so as to rotate in a manner corresponding to the direction of rotation about said first translational axis, and wherein said second wheel is physically aligned in relation to said housing so as to rotate in a manner corresponding to the direction of rotation about said second translational axis, and wherein said third wheel is physically aligned in relation to said housing so as to rotate in a manner corresponding to the direction of rotation about said third translational axis, whereby rotational movements of said first wheel visually correspond to changes in the orientation of said object on said display with respect to said first translational axis, whereby rotational movements of said second wheel visually correspond to changes in the orientation of said object on said display with respect to said second translational axis, and whereby rotational movements of said third wheel visually correspond to changes in the orientation of said object on said display with respect to said third translational axis.

14. The device as recited in claim 9, wherein said first bidirectional manipulator is physically aligned in relation to said housing so as to move in a manner corresponding to the direction of rotation about said first translational axis, and wherein said second bidirectional manipulator is physically aligned in relation to said housing so as to move in a manner corresponding to the direction of rotation about said second translational axis, and wherein said third bidirectional manipulator is physically aligned in relation to said housing so as to move in a manner corresponding the direction of rotation about said third translatinal axis, whereby movements of said first bidirectional manipulator visually correspond to changes in the orientation of said object on said display with respect to said first translational axis, whereby movements of said second wheel visually correspond to changes in the orientation of said object on said display with respect to said second translational axis, and whereby movements of said third bidirectional manipultor visually correspond to changes in the orientation of said object on said display with respect to said third translational axis.

15. The device as recited in claim 1, wherein the bidirectional movement of said belt is unbounded.

16. The device as recited in claim 1, wherein said housing further includes a belt enclosure affixed to said housing for extending a portion of said belt away from said housing, said enclosure having an aperture through which said fingers can be inserted to engage said belt.

17. A device for providing signals indicative of an object's location on a display, comprising:
   a housing operative to be manipulated by a user;
   a first translation position indicating means affixed to said housing for producing a first signal indicative of a first position of said object on said display with respect to a first translational axis;
   a second translation position indicating means affixed to said housing for producing a second signal indicative of a second position of said object on said display with respect to a second translational axis;
   a third translation position indicating means affixed to said housing including a bidirectional controller operated by one or more fingers of said user, for producing a third signal indicative of a third position of said object on said display with respect to a third translational axis,
      said bidirectional controller including a roller operative to be bidirectionally moved by said fingers and having means for detecting bidirectional movement of said roller and converting the detected movement of said roller to said third signal.
      said roller being affixed to said housing in such a manner that said user can operate said roller equally as well when said device is stationary as when said device is being moved across a surface by said user; and
   a first orientation indicating means affixed to said housing for converting the motion of a first bidirectional manipulator operated by said fingers of said user into a first orientation signal indicative of the orientation of said object on said display with respect to one of said first, second or third translational axis;
   whereby a movement of said device over said surface results in said first and second positions of said object being defined on said display, whereby a movement of said bidirectional controller results in said third position of said object being defined on said display, and whereby a movement of said first bidirectional manipulator results in a change in the orientation of said object.

18. The device as recited in claim 17, wherein said first bidirectional manipulator includes:
   a wheel having means operative to be bidirectionally moved by said fingers of said user; and means for detecting the bidirectional movement of said wheel and converting the detected movement of said wheel to said first orientation signal.

19. The device as recited in claim 18, wherein said wheel is physically aligned in relation to said housing so as to rotate in a manner corresponding to the direction of rotation about said first translational axis, whereby the rotational movement of said wheel visually corresponds to changes in the orientation of said object on said display with respect to said first translational axis.

20. The device as recited in claim 17, and further comprising a second orientation indicating means affixed to said housing for converting the motion of a second bidirectional manipulator operated by said fingers into a second orientation signal indicative of the orientation of said object on said display system with respect to one of said first, second or third translational axis.

21. The device as recited in claim 20, wherein said first bidirectional manipulator includes:
a first wheel having means operative to be bidirectionally moved by said fingers of said user; and
means for detecting the bidirectional movement of said first wheel and converting the detected movement of said first wheel to said first orientation signal.

22. The device as recited in claim 21, wherein said second bidirectional manipulator includes:
a second wheel having means opertive to be bidirectionally moved by said fingers of said user; and
means for detecting the bidirectional movement of said second wheel and converting the detected movement of said second wheel to said second orientation signal.

23. The device as recited in claim 22, wherein said first wheel is physically aligned in relation to said housing so as to rotate in a manner corresponding to the direction of rotation about said first translational axis, and wherein said second wheel is physically aligned in relation to said housing so as to rotate in manner corresponding to the direction of rotation about said second translational axis, whereby rotational movements of said first wheel visually correspond to changes in the orientation of said object on said display with respect to said first translational axis and rotational movements of said second wheel visually correspond to changes in the orientation of said object on said display with respect to said second translational axis.

24. The device as recited in claim 20, and further comprising a third orientation indicating means affixed to said housing for converting the motion of a third bidirectional manipulator operated by said fingers into a third orientation signal indicative of the orientation of said object on said display system with respect to one of said first, second or third translational axis.

25. The device as recited in claim 24, wherein said first bidirectional manipulator includes:
a first wheel having means operative to be bidirectionally moved by said fingers of said user; and
means for detecting the bidirectional movement of said first wheel and converting the detected movement of said first wheel to said first orientation signal.

26. The device as recited in claim 25, wherein said second bidirectional manipulator includes:
a second wheel having means operative to be bidirectionally moved by said fingers of said user; and
means for detecting the bidirectional movement of said second wheel and converting the detected movement of said second wheel to said second orientation signal.

27. The device as recited in claim 26, wherein said third bidirectional manipulator includes:
a third wheel having means operative to be bidirectionally moved by said fingers of said user; and
mans for detecting the bidirectional movement of said third wheel and converting the detected movement of said third wheel to said third orientation signal.

28. The device as recited in claim 27, wherein said first wheel is physically aligned in relation to said housing so as to rotate in a manner corresponding to the direction of rotation about said first translational axis, and wherein said second wheel is physically aligned in relation to said housing so as to rotate in a manner corresponding to the direction of rotation about said second translational axis, and wherein said third wheel is physically aligned in relation to said housing so as to rotate in a manner corresponding to the direction of rotation about said third translational axis, whereby rotational movements of said first wheel visually correspond to changes in the orientation of said object on said display with respect to said first translational axis, whereby rotational movements of said second wheel visually correspond to changes in the orientation of said object on said display with respect to said second translational axis, and whereby rotational movements of said third wheel visually correspond to changes in the orientation of said object on said display with respect to said third translational axis.

29. The device as recited in claim 24, wherein said first bidirectional manipulator is physically aligned in relation to said housing so as to move in a manner corresponding to the direction of rotation about said first translational axis, and wherein said second bidirectional manipulator is physically aligned in relation to said housing so as to move in a manner corresponding to the direction of rotation about said second translational axis, and wherein said third bidirectional manipulator is physically aligned in relation to said housing so as to move in a manner corresponding the direction of rotation about said third translational axis, whereby movements of said first bidirectional manipulator visually correspond to changes in the orientation of said object on said display with respect to said first translational axis, whereby movements of said second wheel visually correspond to changes in the orientation of said object on said display with respect to said second translational axis, and whereby movements of said third bidirectional manipulator visually correspond to changes in the orientation of said object on said display with respect to said third translational axis.

30. Apparatus for generating signals indicative of the three-dimensional position and orientation of an object, comprising:
an external housing;
a first translation position indicating means mounted to said housing for producing a first signal indicative of a first position of said object along a first axis;
a second translation position indicating means mounted to said housing for producing a second signal indicative of a second position of said object along a second axis;
a third translation position indicating means mounted to said housing for converting the motion of a bidirectional controller into a third signal indicative of a third position of said object along a third axis, said bidirectional controller having a belt opertive to be bidirectionally moved by a finger of said user and means for detecting the bidirectional movement of said belt and converting the detected movement of said belt to said third signal, said belt including a plurality of fingertip sized holes formed therein through which said finger can be inserted; and a first orientation indicating means affixed to said housing for converting the motion of a first bidirectional manipulator operated by one or more fingers of a user into a first orientation signal indicative of the orientation of said object with respect to one of said first, second or third axes;

whereby movement of said apparatus over a surface results in said first and second positions of said object being defined, whereby movement of said bidirectional controller results in said third position of said object being defined, and whereby a movement of said first bidirectional manipulator results in a change in the orientation of said object.

31. The device as recited in claim 30, and further comprising a second orientation indicating means affixed to said housing for converting the motion of a second bidirectional manipulator operated by said fingers into a second orientation signal indicative of the orientation of said object with respect to one of said first, second or third axes.

32. The device as recited in claim 31 and further comprising a third orientation indicating means affixed to said housing for converting the motion of a third bidirectional manipulator operated by said fingers into a third orientation signal indicative of the orientation of said object with respect to one of said first, second or third axes.

* * * * *